Patented June 5, 1923.

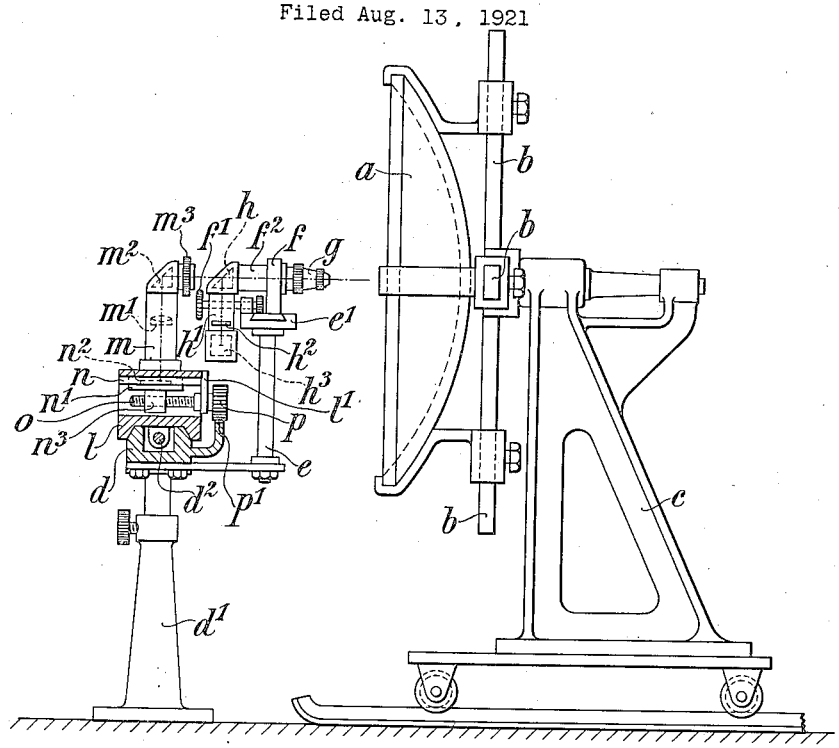
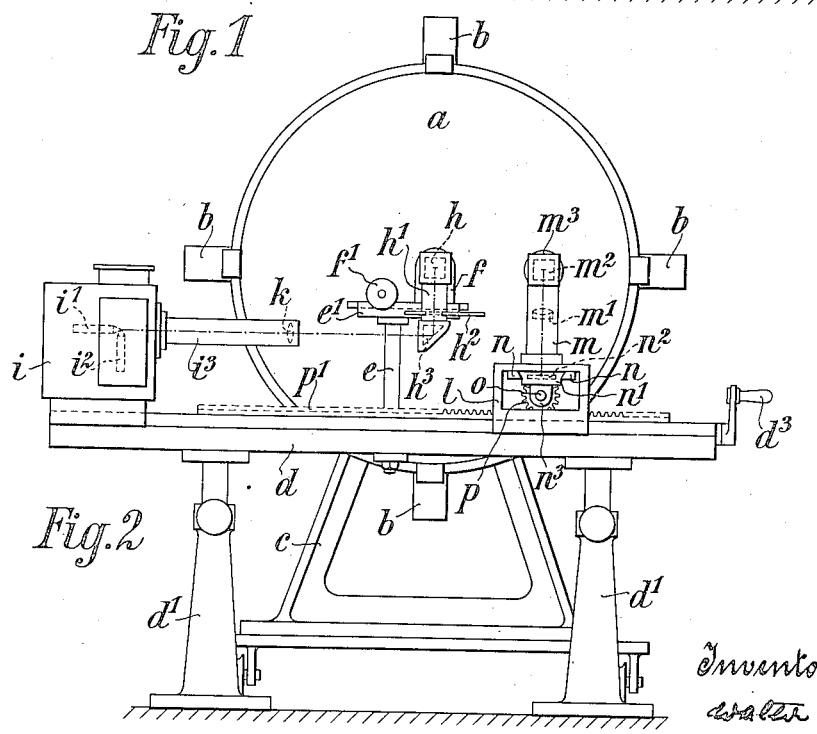

1,457,918

UNITED STATES PATENT OFFICE.

WALTER VILLIGER AND ROBERT MECHAU, OF JENA, GERMANY, ASSIGNORS TO THE FIRM OF CARL ZEISS, OF JENA, GERMANY.

ARRANGEMENT FOR THE EXAMINATION OF COLLECTIVE OPTICAL SYSTEMS.

Application filed August 13, 1921. Serial No. 492,091.

(GRANTED UNDER THE PROVISIONS OF THE ACT OF MARCH 3, 1921, 41 STAT. L., 1313.)

*To all whom it may concern:*

Be it known that we, WALTER VILLIGER and ROBERT MECHAU, citizens of the German Empire, residing at Jena, Germany, have invented a new and useful Arrangement for the Examination of Collective Optical Systems (for which we have filed an application in Germany March 19, 1914; in England June 22, 1920, Patent 145504; in Italy July 7, 1920; in France July 16, 1920, Patent 520615, and in Japan, July 29, 1920), of which the following is a specification.

The invention relates to an arrangement for the examination of concave mirrors or collective lenses, the function of which is to reflect, or to refract respectively, all the rays emanating from the focal point so as to be directed parallel to the optical axis. The object of the invention is to record in a simple and clear manner the degree of perfection in which the said condition is complied with. In the following, the invention is elucidated only as regards an arrangement for examining concave mirrors; for the examination of collective lenses the arrangement has to be suitably altered in conformity with the different manner in which lenses act as compared with mirrors.

The tracing method the invention is based upon corresponds to a well-known method employed for the examination of objectives, and consists in the following. In the focal point of the mirror to be examined a source of light is located, such as may for all practical purposes be considered to be with sufficient accuracy, point-shaped, and which illuminates the whole effective surface of the mirror. Now, the reflected rays are more or less exactly parallel to one another, according to the quality of the optically effective surfaces, or the homogeneous structure of the material used in manufacture. To ascertain the degree of parallelism, pencils of the reflected rays having a comparatively small cross-section are selected from various places of the entire cross-section, and by means of a collective system the rays of each pencil are united to form images of the source of light. Now, if all the rays reflected by the concave mirror were strictly parallel to one another, the image-points formed would in every instance have a similar position with respect to the collective system, regardless of which place of the entire cross-section of the rays the image-forming small pencil has been selected from, in reality, however, the resulting image-points will appear more or less displaced in the image plane the amount of displacement being dependent on the quality of the mirror. This displacement affords a measure for the deviations of the reflected rays from the direction of the axis of the respective mirror.

For employing the said tracing method in accordance with the invention, an arrangement serves which is constituted as follows. In front of the mirror to be examined a carriage may be displaced in a guide in a rectilinear direction, approximately perpendicularly to the axis of the mirror. The carriage either supports merely a reflector system, which deflects the incident rays by a constant angle approximately in the direction of the carriage guide, and directs them to a collective system, which is fixed laterally to the concave mirror, or it carries a collective system itself, which serves for the said purpose. Behind the collective system a sensitized plate is disposed, the said system uniting the rays of the pencil of light impinging upon it in each case to form an image-point on the said plate which latter is coupled with the carriage in such a manner that any displacement of the carriage results in a movement of the plate in its plane.

When the carriage is moved in its guide in front of the mirror, for instance in such a manner that the part limiting the small pencils of rays moves in a meridional plane of the mirror, the various image-points unite to form a curve, which permits of ascertaining the quality of the mirror at each of the points of the respective meridian of the mirror.

In the meridional direction the deviations of the rays reflected by the mirror claims special interest, they being as a rule substantially greater than the deviations in sagittal direction. Therefore, the arrangement will be suitably disposed in such a manner that by moving the carriage the sensitized plate becomes displaced in its plane in such a manner that the direction of this displacement is perpendicular to that direction in which on account of a meridional imperfection an image-point is displaced away from its normal position.

The size of the image-points formed by the collective system in its focal plane, and simultaneously the accuracy of the examination, are dependent on the size of the source of light disposed in the focal point of the mirror to be tested. Hence, in order that the rays of the small pencils are united to form, as near as this is possible, image-points in the proper sense of the word, it is essential that the source of light itself be as near point-shaped as possible. And yet it must be sufficiently brilliant, for which reason it is recommended to employ a powerful microscope-objective to which a pencil of rays is directed by a source of light, say a laterally disposed projection lamp, and the numerical aperture of which is large enough to ensure that the entire surface of the mirror to be examined be covered by the objective. The microscope-objective unites the rays of the pencil of light thus directed to it to form in proximity to its end surface an image of the source of light, which image is to all intents and purposes completely point-shaped. In order to be able to vary the luminosity, without lessening the aperture, the rays of the pencil of light may be united to form an image of the source of light before reaching the microscope-objective, which is done with the aid of a condensor system, and in the locus of the said image an adjustable diaphragm is fitted.

When using concave mirrors in practice, such as searchlight reflectors for instance, the source of light employed is, as a rule, not point-shaped. Therefore, it not only matters in which manner the rays emanating from the very focal point are deflected, but attention is also to be paid to the deviation resulting from the finite dimension of the source of light. Hence, in such cases in addition to the examination of a point-shaped source of light disposed in the focal point, a similar testing of point-shaped sources of light will have to take place which, within the focal plane, are situated by the requisite amount laterally of the optical axis. To avoid using a separate source of light for each position, it will be recommended to employ a point-shaped source of light which may be displaced within the focal plane of the mirror to be examined. For instance, if concave mirrors for search-lights are to be tested which are fitted with an electric arc lamp, the point-shaped source of light after first being employed for examination in the focal point will then be displaced in the focal plane by half the amount of the diameter of the crater of the positive carbon in the two opposite directions, and the examination be extended to these two outermost positions.

The curve of deviation with respect to the focal point and the curves pertinent to the lateral positions of the source of light may be reproduced on one and the same plate so that all deviations occurring when employing the mirror will be recorded in one picture.

In hollow glass mirrors which are silvered on the back the incident rays are, as is well known, reflected not only from the silvered surface but also from the uncoated front surface. Thus, depending on how often and by which surfaces the incident rays are reflected, there result different pencils of rays which are more or less parallel to one another, of which, however, the principal reflexion, i. e. that pencil which is reflected from the silvered surface but once, is by far the most brilliant. If a mirror of the said kind be examined by means of the new arrangement, the image-points formed by the collective system not only comprise in each case an image of great brilliancy evoked by the rays of the principal reflexion, but also comparatively less brilliant images formed by the rays of the secondary reflexions, which latter images, according to the quality of the mirror, appear also more or less displaced with respect to the collective system. In this manner, therefore, additional information is obtained as to how far the rays of the secondary reflexions are parallel to those of the principal reflexion.

The annexed drawing shows, as a constructional example of the invention, a diagrammatic view of an arrangement for the examination of concave mirrors. Fig. 1 shows a side view of the arrangement, partly in section, Fig. 2 is a front view of the arrangement.

A concave mirror $a$, which is to be examined, is by means of a cross $b$ supported in a portable frame $c$ so as to be rotatable about its optical axis. In front of the mirror $a$, perpendicularly to its axis, an optical bench $d$ is located, supported upon two adjustable standards $d^1$. The optical bench is, approximately in its middle, provided with a lateral standard $e$, which carries at its uppermost end a carriage-guide $e^1$, which is perpendicular to the axis of the mirror. A carriage $f$ slides in the guide $e^1$ and may be adjusted by actuating a milled disc $f^1$; to this carriage there is connected a short tube $f^2$, which is parallel to the axis of the mirror. At the side facing the mirror $a$ the tube $f^2$ carries a microscope-objective $g$, the optical axis of which lies in a horizontal plane along with the axis of the mirror, at the other side it carries in the first place a reflecting prism $h$, and below it, in a vertically arranged tube $h^1$, a Waterhouse diaphragm $h^2$ having various openings of different diameter, and, furthermore, at the end of the tube $h^1$ a second reflecting prism $h^3$. By moving the carriage $f^2$ the microscope-objective, together with the parts in connection therewith, may be displaced perpendicularly to the axis of the mirror in the horizontal plane passing through the said axis. At its left hand extremity the optical bench $d$ carries a projection lamp, which is indicated by a casing $i$ and two carbons $i^1$ and $i^2$, and which in a tube $i^3$ fixed to its casing $i$ contains a condenser lens $k$. (For the sake of not impairing the clearness of the drawing the projection lamp has been left out in Fig. 1.) On the optical bench $d$ there is disposed a box-shaped carriage $l$, which by means of a screw-spindle $d^2$ supported in the optical bench $d$ and a crank $d^3$ may be moved along the bench. On its top surface the carriage $l$ carries a vertically disposed tube $m$, which contains a photographic objective $m^1$, and which at its uppermost end is provided with a reflecting prism $m^2$ and an iris diaphragm $m^3$ the opening of which faces the mirror $a$. The centre of the opening of the iris diaphragm $m^3$ lies in the horizontal plane passing through the axis of the mirror. In the interior of the box-shaped carriage $l$, to its uppermost side, a horizontal carriage-guide $n$ is fixed, which is perpendicular to the optical bench $b$, and in which a carriage $n^1$ may slide. The carriage $n^1$ is so constructed that it serves as a dark-slide for a sensitized plate $n^2$, which is indicated by dotted lines, and which lies in the focal plane of the photographic objective $m^1$, and on the bottom surface of the carriage $n^1$ there is a nut $n^3$ in which a screw-spindle $o$ engages. The screw-spindle $o$ is so disposed as to be rotatable in a lateral projection $l^1$ of the carriage $l$, but it may not be displaced in an axial direction, and it is rigidly connected to a toothed wheel $p$, which engages in a rack $p^1$, which is united with the optical bench $d$ and parallel thereto. When the carriage $l$ is moved along the optical bench $d$, the toothed wheel $p$ by travelling on the rack $p^1$ causes a rotation of the screw-spindle $o$ and thereby a displacement of the plate $n^3$ in its plane, which displacement is obliquely directed to that of the carriage $l$.

When using the arrangement, the rays of light emanating from the projection lamp and collected by the condenser lens $k$ are directed to the reflecting prism $h^3$, and united to form an image of the source of light at the locus of the Waterhouse diaphragm $h^2$. The luminosity may be varied as it is required in every instance by introducing an appropriate opening of the Waterhouse diaphragm $h^2$. Behind this diaphragm the rays of light impinge upon the reflecting prism $h$, which directs them to the microscope-objective $g$, which, in close proximity to its outer surface, forms under wide-angled convergent pencils a second, minute image of the source of light, this second image serving as a point-shaped source of light for the illumination of the mirror $a$ which is to be examined. The iris diaphragm $m^3$ disposed on the carriage $l$, limits in any position of the carriage $l$ in front of the mirror, a corresponding pencil of light of the rays reflected by the mirror $a$, which rays are approximately parallel to one another, the pencil of light thus limited having the same cross-section as the chosen diaphragm opening, and is directed by the reflecting prism $m^2$ to the photographic objective $m^1$. This latter unites the rays of light thus directed to it in each case to form an image of the source of light on the sensitized plate $n^2$, the position of each image affording a measure for the dispersion adherent to the respective place of the mirror $a$. When, on the iris diaphragm $m^3$ being opened, the carriage $l$ is moved along the optical bench $d$, the photographic objective $m^1$ reproduces on the sensitized plate a curve of the aberrations occurring in that meridian of the mirror which happens to have been selected.

We claim:

1. In an arrangement for the examination of optical collective systems adapted to deflect rays impinging on it a point-shaped source of light disposed in the focal plane of the system to be examined, a rectilinear guide approximately perpendicular to the optical axis of the said system, a carriage displaceable along the said guide, a device for selecting a pencil of rays out of the light deflected by the said system and uniting the rays of this pencil to form an image-point, which device is supported by the said carriage, a sensitized plate disposed in the focus of the said device, and means for so coupling the said plate with the said carriage that any displacement of the latter results in a movement of the said plate in its plane.

2. In an arrangement for the examination of optical collective systems adapted to deflect rays impinging on it a source of light, a microscope objective forming an image of the said source of light in the focal plane of the system to be examined, a rectilinear guide approximately perpendicular to the optical axis of the said system, a carriage displaceable along the said guide, a device for selecting a pencil of rays out of the light deflected by the said system and uniting the rays of this pencil to form an image-point, which device is supported by the said carriage, a sensitized plate disposed in the focus of the said device, and means for so coupling the said plate with the said carriage that any displacement of the latter results in a movement of the said plate in its plane.

3. In an arrangement for the examination of optical collective systems adapted to deflect rays impinging on it a source of light, a microscope objective displaceably disposed in a plane parallel to the focal plane of the said system and forming an image of the said source of light in the focal plane of the system to be examined, a rectilinear guide approximately perpendicular to the optical axis of the said system, a carriage displaceable along the said guide, a device for selecting a pencil of rays out of the light deflected by the said system and uniting the rays of this pencil to form an image-point, which device is supported by the said carriage, a sensitized plate disposed in the focus of the said device, and means for so coupling the said plate with the said carriage that any displacement of the latter results in a movement of the said plate in its plane.

4. In an arrangement for the examination of optical collective systems adapted to deflect rays impinging on it a point-shaped source of light disposed in the focal plane of the system to be examined, a rectilinear guide approximately perpendicular to the optical axis of the said system, a carriage displaceable along the said guide, a reflector system supported by the said carriage, an objective system, the said reflector system transmitting a pencil of rays deflected by the system to be examined to the said objective system, a sensitized plate disposed behind the said objective system, on which plate the objective system unites the rays of the pencil impinging upon it to form an image-point and means for so coupling the said plate with the said carriage that any displacement of the latter results in a movement of the said plate in its plane.

WALTER VILLIGER.
ROBERT MECHAU.